(12) United States Patent
Cudak et al.

(10) Patent No.: US 9,497,580 B1
(45) Date of Patent: Nov. 15, 2016

(54) USING APPLICATION CONTEXT TO FACILITATE PAIRING WITH A PERIPHERAL DEVICE

(71) Applicant: Lenovo Enterprise Solutions (Singapore) Pte. Ltd., Singapore (SG)

(72) Inventors: Gary D. Cudak, Wake Forest, NC (US); Nathan J. Peterson, Durham, NC (US); Jennifer J. Lee-Baron, Morrisville, NC (US); Bryan L. Young, Tualatin, OR (US); Amy L. Rose, Chapel Hill, NC (US); John S. Crowe, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/078,756

(22) Filed: Mar. 23, 2016

(51) Int. Cl.
*H04W 4/00* (2009.01)
*H04W 8/00* (2009.01)
*H04W 76/02* (2009.01)

(52) U.S. Cl.
CPC ............. *H04W 4/008* (2013.01); *H04W 8/005* (2013.01); *H04W 76/023* (2013.01)

(58) Field of Classification Search
CPC ............................. H04W 4/008; H04L 67/303
See application file for complete search history.

(56) References Cited

U.S. PATENT DOCUMENTS

| | | | | |
|---|---|---|---|---|
| 2010/0302958 | A1* | 12/2010 | Wietfeldt | H04W 76/025 370/252 |
| 2011/0280403 | A1* | 11/2011 | DeLuca | H04L 67/16 380/278 |
| 2014/0019304 | A1* | 1/2014 | Lee | G06Q 10/00 705/26.81 |
| 2015/0264731 | A1* | 9/2015 | Lin | H04L 67/26 455/41.2 |
| 2016/0057564 | A1* | 2/2016 | Sim | H04W 4/008 455/41.2 |

OTHER PUBLICATIONS

"How to Use Bluetooth in Car Technology: Making the Connection", http://www.buick.com/how-to-use-bluetooth.html, Jan. 11, 2016, 2 pages.

\* cited by examiner

*Primary Examiner* — David Bilodeau
(74) *Attorney, Agent, or Firm* — Katherine S. Brown; Jeffrey L. Streets (57) ABSTRACT

A method is provided for pairing a computing device with a peripheral device. The method includes identifying an application that is running on a computing device, and accessing a list of applications, wherein the list of applications identifies a context description associated with each application. The method further includes identifying accessible peripheral devices and a peripheral device type of each accessible peripheral device, and accessing a list of peripheral device types, wherein the list of peripheral device types identifies a context description associated with each peripheral device type. Still further, the method includes selecting a first one of the accessible peripheral devices having an identified peripheral device type that is, according to the list of peripheral device types, associated with a context description that is, according to the list of applications, associated with the identified application. The method then automatically pairs the computing device with the first accessible peripheral device.

20 Claims, 5 Drawing Sheets

| Application | State | Context Description |
|---|---|---|
| Pandora™ | – | music |
| Air Drop™ | – | file transfer |
| Skype™ | – | phone calls |
| PhotoShop™ | – | images |
| Word™ | editing | documents |
| | printing | images |
| YouTube™ | – | videos |
| Facebook™ | posting | images |
| | viewing | file transfer |

FIG. 3

| Device Type | Context Description |
|---|---|
| Speaker | music, videos |
| Headphones | music, videos |
| Earpiece | phone calls |
| Printer | images, documents |
| Laptop Computer | file transfer |
| Camera | images |
| Data Storage | file transfer, documents, images |

FIG. 4

Device Pairing — User History Statistics

| Application | Device | % |
|---|---|---|
| PhotoShop™ | Printer<br>Data Storage<br>Camera | 80<br>20<br>0 |
| Skype™ | Earpiece | 100 |
| Pandora™ | Headphones<br>Speaker | 70<br>30 |
| YouTube™ | Speaker<br>Headphones | 90<br>10 |

USING APPLICATION CONTEXT TO FACILITATE PAIRING WITH A PERIPHERAL DEVICE

BACKGROUND

Field of the Invention

The present invention relates to methods of pairing devices in a wireless personal area network.

Background of the Related Art

Various modern electronic devices are equipped with hardware and software systems for exchanging data over short distances using a wireless technology standard to form a personal area network (PAN). One such wireless technology standard is known as Bluetooth™ (a trademark of the Bluetooth Special Interest Group) and is set out in IEEE 802.15.1. For example, a computing device, such as a laptop computer, table computer or mobile smartphone, may meet the Bluetooth SIG standards and may therefore be referred to as a Bluetooth™ device. This capability may be included in original equipment or may be added as a Bluetooth™ USB dongle or internal Bluetooth™ card.

A personal area network, such as Bluetooth™, is particularly useful for establishing short range connections between devices for the purpose of providing a service. The process of establishing such a connection between two compatible devices may be referred to as "pairing". For example, a computing device may be setup to discover any nearby Bluetooth™ compatible devices. After discovery such as device, a user of the computing device may determine whether or not to pair with a second device or accessory, and indicate whether to allow subsequent automatic connections between the two devices when in range. For example, some automobiles are equipped with Bluetooth™ capabilities and allow automatic connections when a particular device is in range. This avoids having to repeatedly perform manual pairing steps and decisions.

However, when multiple Bluetooth™ devices are in range, auto-pairing may still require manual user action in order to establish the desired connection. For example, a computing device, such as a smartphone, may typically have a pairing with a speaker device but a user may currently desire to pair the computing device with computer to facilitate file transfers. Still further, the user's automobile that typically pairs with the computing device may also be in range on the computing device. When there are several compatible device s to pair with, this presents a problem. Specifically, a user must manually select the device or devices with which to pair at the present time.

BRIEF SUMMARY

One embodiment of the present invention provides a method, comprising identifying an application that is running on a computing device, and accessing a list of applications, wherein the list of applications identifies a context description associated with each application. The method further comprises identifying accessible peripheral devices and a peripheral device type of each accessible peripheral device, and accessing a list of peripheral device types, wherein the list of peripheral device types identifies a context description associated with each peripheral device type. Still further, the method comprises selecting a first one of the accessible peripheral devices having an identified peripheral device type that is, according to the list of peripheral device types, associated with a context description that is, according to the list of applications, associated with the identified application. The method then automatically pairs the computing device with the first accessible peripheral device.

Another embodiment of the present invention provides a computer program product comprising a non-transitory computer readable storage medium having program instructions embodied therewith, the program instructions executable by a processor to cause the processor to perform a method. The method comprises identifying an application that is running on a computing device, and accessing a list of applications, wherein the list of applications identifies a context description associated with each application. The method further comprises identifying accessible peripheral devices and a peripheral device type of each accessible peripheral device, and accessing a list of peripheral device types, wherein the list of peripheral device types identifies a context description associated with each peripheral device type. Still further, the method comprises selecting a first one of the accessible peripheral devices having an identified peripheral device type that is, according to the list of peripheral device types, associated with a context description that is, according to the list of applications, associated with the identified application. The method then automatically pairs the computing device with the first accessible peripheral device.

DETAILED DESCRIPTION

One embodiment of the present invention provides a method, comprising identifying an application that is running on a computing device, and accessing a list of applications, wherein the list of applications identifies a context description associated with each application. The method further comprises identifying accessible peripheral devices and a peripheral device type of each accessible peripheral device, and accessing a list of peripheral device types, wherein the list of peripheral device types identifies a context description associated with each peripheral device type. Still further, the method comprises selecting a first one of the accessible peripheral devices having an identified peripheral device type that is, according to the list of peripheral device types, associated with a context description that is, according to the list of applications, associated with the identified application. The method then automatically pairs the computing device with the first accessible peripheral device.

The computing device may be any type of computing device that is capable of pairing with one or more peripheral device. While pairing capability is often implemented on a mobile communication device, pairing capability may also be implemented on a desktop computer, server, or home appliance. Non-limiting examples of computing devices that may be considered to be mobile communication devices include a smartphone, tablet computer, laptop computer and automobile. The computing device (the master device) is able to discover one or more other devices (a slave device), referred to herein as accessible peripheral devices, that are capable of pairing and are in a mode to be discovered by the computing device. Accordingly, there are situations where the computing device may pair with another computing device such that one of the computing devices may serve as a peripheral device. Non-limiting examples of peripheral device types include a printer, speaker, headphones, scanner, microphone, stereo, video display, camera, mouse, keyboard, smartphone, tablet computer, desktop computer, server, wearable computer, set-top box, remote control, game/toy, health monitor, network access point, home appliance, and automobile.

The computing device and one or more peripheral device may use any available communication standard or protocol for forming and managing a personal area network (PAN). One such standard is the Bluetooth™ short distance wireless standard, which is managed by the Bluetooth Special Interest Group (SIG). Accordingly, the computing device may pair with multiple peripheral devices, which may or may not form a piconet.

An application or "app" includes program code that is executable by a processor in the computing device. Optionally, the peripheral device may also have a processor that executes one or more application. When an application is opened or initiated, some portion of the program code is executed by the processor and is loaded into memory. The application may then be ready to perform services or functions until the application is closed or ended. Accordingly, an application may be referred to as "running" or "open" from the time that the application is first opened until the time that the application is closed. However, if a user is not actively using the application, previous application tasks may be completed such that the application becomes idle and may simply run in the background. In a Windows™ environment, the active application is associated with the window that has been most recently used such that further input or cursor control is directed to the interface displayed in that window. In a smartphone environment, such as iOS, the active application is typically displayed and remains available for direct user input. Some applications, such as a music player, may remain active without being displayed if they are continuing to produce output. In one method, the step of identifying an application that is running on a computing device, includes identifying an application that is currently the active application on the computing device. In an alternative method, the step of identifying an application that is running on a computing device, includes identifying an application that has most recently been opened.

The computing device accesses a list of applications, wherein the list of applications identifies a context description associated with each application. The applications on the list may be those applications that are stored on the computing device and/or those application that are accessible over a network, such as remote storage assigned to the computing device. One example of such remote storage is iCloud™ provided by Apple Inc. An application context description identifies the nature or subject matter of the application. For example, an application may be a music player that organizes and plays music files, and the context description of the application may be simply "music". The user may vary the level of detail in a context description as such detail becomes helpful in distinguishing how the application is used and the peripheral device types that the application should or should not use. Optionally, an application may have multiple states or functions, where each state or function has a different context description. For example, a social media application may have a first state for posting images and a second state viewing notifications, or a work processing application may have a first state for editing documents and a second state for printing images. The context description associated with each application may be based on history of pairings for the computing device (e.g. Pandora is historically associated with music), based on metadata of the application (e.g. a GPS application includes metadata with the term "vehicle navigation"), or based on user input to a graphical user interface allowing customized context descriptions.

The computing device also accesses a list of peripheral device types, wherein the list of peripheral device types identifies a context description associated with each peripheral device type. The list of peripheral device types may be stored by the computing device or accessed from remote storage. Furthermore, the list of peripheral device types may be a standard comprehensive list of device types, or a customized list of device types with which the computing device has previously paired. Such a customized list may be expanded over time as additional peripheral device types are discovered and paired. In one example, a peripheral device of the device type "speaker" may be associated with a context description that includes "music" or "audio".

The method may automatically pair the computing device with the first accessible peripheral device that has been selected. For example, the method may select a first one of the accessible peripheral devices having an identified peripheral device type that is, according to the list of peripheral device types, associated with a context description that is, according to the list of applications, associated with the identified application. Optionally, automatic pairing may be a user setting. When automatic pairing is disabled, the method may still select one or more accessible peripheral devices as described, and then prompt the user to confirm or accept the selection.

In one optional feature, the method may further comprise detecting that the identified application has changed from a first state to a second state. Accordingly, each state of the application may have its own context description. This embodiment recognizes that a single application may have multiple contexts, such as a presentation application that has a first state for receiving user input to build the presentation and a second state for outputting the final presentation to an audience. In this example, the two states have very different context descriptions to reflect that the first state could benefit from the use of a peripheral device that provides input, such as a keyboard or mouse, whereas the second state could benefit from the user of a peripheral device that accepts output, such as a display screen or printer. After detecting the change from the first state to the second state, the method may then select a second one of the accessible peripheral devices having an identified peripheral device type that is, according to the list of peripheral device types, associated with a context description that is, according to the list of applications, associated with the identified application in the second state. If automatic pairing is enabled, the computing device may then be automatically paired with the second accessible peripheral device. If automatic pairing is disable, the method may identify multiple accessible peripheral devices having an identified peripheral device type that is, according to the list of peripheral device types, associated with a context description that is, according to the list of applications, associated with the identified application in the second state, and prompt a user for input selecting one of the identified multiple accessible peripheral devices. The method would then pair the computing device with the user-selected peripheral device.

In another optional feature, the method may identify a new application that is not on the list and use metadata of the new application to identify a context description of the new application. For example, the new application may be newly installed or downloaded from an app store. The new application may be added to the list of applications in association with the identified context description of the new application.

In yet another optional feature, the method may include maintaining a history of pairings between the computing device and peripheral devices, wherein each record of the history identifies the peripheral device that was paired with the computing device and the application running on the computing device that interacted with the peripheral device. The history of pairings may be used to select between two or more peripheral devices having identified peripheral device types that are, according to the list of peripheral device types, associated with a context description that is, according to the list of applications, associated with the identified application. For example, while a speaker and a pair of headphones may be both associated with a context description that includes "music" and "videos", a user history may indicate that the computing device pairs with headphones 90% of the time in the application context description of "music" (i.e., when using Pandora™) and pairs with speakers 80% of the time in the application context of "videos" (i.e., when using YouTube™).

In a further optional feature, the method may include detecting that the currently active application has switched from a first application to a second application. Accordingly, the method may then select a second one of the accessible peripheral devices having an identified peripheral device type that is, according to the list of peripheral device types, associated with a context description that is, according to the list of applications, associated with the second application, and automatically pair the computing device with the second accessible peripheral device. However, if automatic pairing is disabled, then subsequent to detecting that the currently active application has switched from a first application to a second application, then method may identify one or more accessible peripheral devices having an identified peripheral device type that is, according to the list of peripheral device types, associated with a context description that is, according to the list of applications, associated with the second application. The user is then prompted for input, either for confirmation of a suggested pairing in the case that only one accessible peripheral device is identified as meeting the foregoing criteria, or for a selection of a peripheral device in the case that multiple accessible peripheral devices satisfying the foregoing criteria are identified. Based upon the user input, the method may then pair the computing device with the user-selected peripheral device.

Another embodiment of the present invention provides a computer program product comprising a non-transitory computer readable storage medium having program instructions embodied therewith, the program instructions executable by a processor to cause the processor to perform a method. The method comprises identifying an application that is running on a computing device, and accessing a list of applications, wherein the list of applications identifies a context description associated with each application. The method further comprises identifying accessible peripheral devices and a peripheral device type of each accessible peripheral device, and accessing a list of peripheral device types, wherein the list of peripheral device types identifies a context description associated with each peripheral device type. Still further, the method comprises selecting a first one of the accessible peripheral devices having an identified peripheral device type that is, according to the list of peripheral device types, associated with a context description that is, according to the list of applications, associated with the identified application. The method then automatically pairs the computing device with the first accessible peripheral device.

The foregoing computer program product may further include program instructions for implementing or initiating any one or more aspects of the methods described herein. Accordingly, a separate description of the methods will not be duplicated in the context description of a computer program product.

Figure 1:
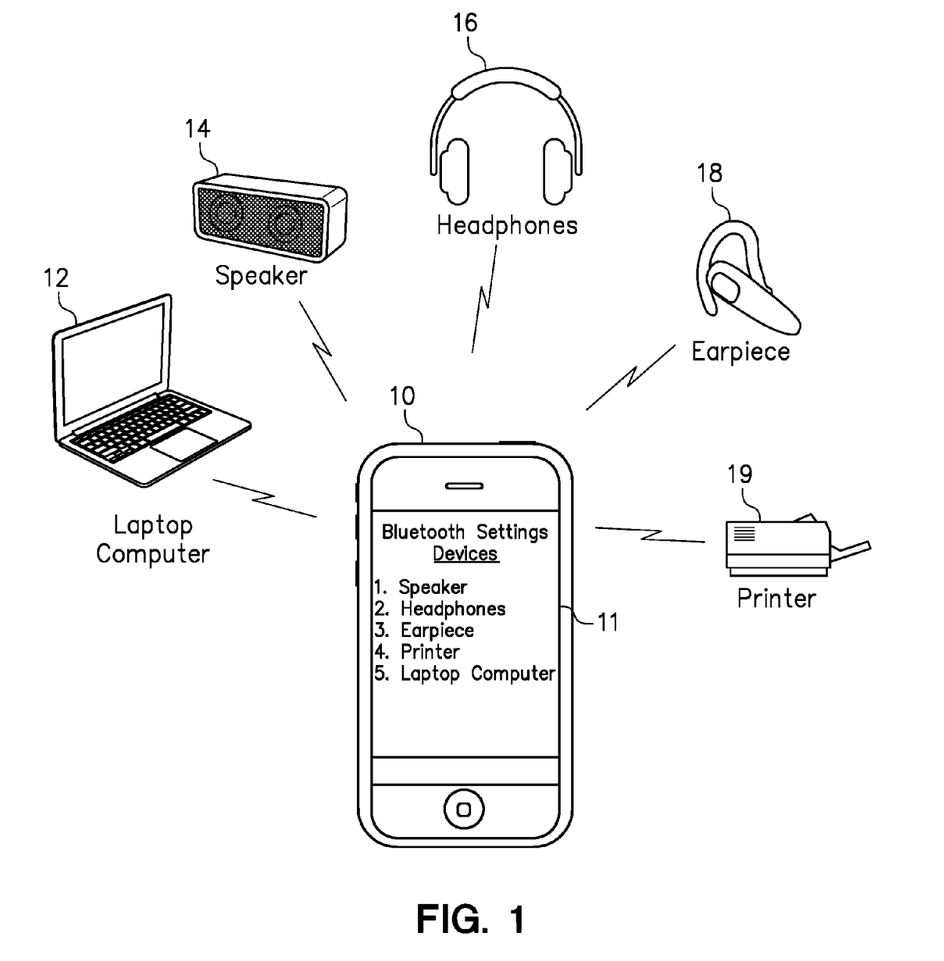
FIG. 1 is a diagram of a computing device in the form of a smartphone discovering multiple accessible peripheral devices.

FIG. 1 is a diagram of a computing device in the form of a smartphone 10 discovering multiple accessible peripheral devices using a short range wireless communication standard such as Bluetooth™. Specifically, the smartphone 10 has discovered a laptop computer 12, a speaker 14, a set of headphones 16, an earpiece 18, and a printer 20. The smartphone 10 has a graphical user interface displayed on its screen 11 such that a user may select from among the accessible peripheral devices and pair with a selected device.

Figure 2:
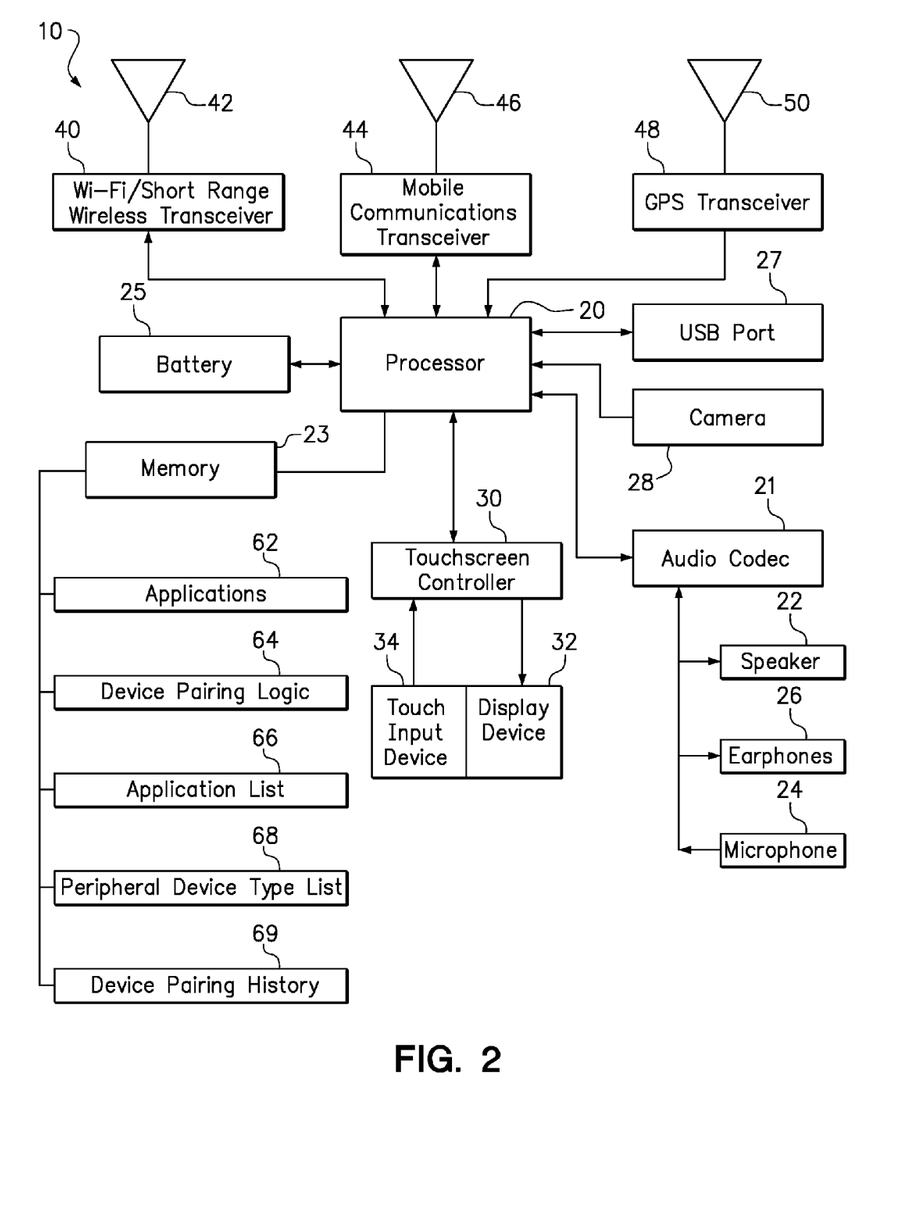
FIG. 2 is a diagram of a smart phone that may pair with one or more accessible peripheral devices according to various embodiments of the present invention.

FIG. 2 is a diagram of the mobile communication device 10, such as a smart phone, that may discover and pair with one or more peripheral device according to various embodiments of the present invention. The computing device 10 may include a processor 20, memory 23, a battery 25, a universal serial bus (USB) port 27, a camera 28, and an audio codec 21 coupled to a built-in speaker 22, a microphone 24, and an earphone jack 26. The communication device 10 may further include a touchscreen controller 30 which provides a graphical output to the display device 32 and an input from a touch input device 34. Collectively, the display device 32 and touch input device 34 may be referred to as a touchscreen.

The computing device 10 may also include a Wi-Fi™ and/or Bluetooth™ transceiver 40 and corresponding antenna 42, a mobile communication transceiver 44 and corresponding antenna 46, and/or a global positioning system (GPS) transceiver 48 and corresponding antenna 50. Accordingly, the Bluetooth™ transceiver 40 enables communication between the mobile communication device 10 and an accessible Bluetooth™ peripheral device. In order to implement one or more embodiment of the present invention, the memory 14 may store applications 62, device pairing logic 64, an application list 66 and a peripheral device type list 68. For example, one or more of the applications 62 may be opened and the device pairing logic 64 may use the application list 66 and the peripheral device type list 68 to select an accessible peripheral device to pair with the computing device 10 in accordance with an embodiment of the present invention. Furthermore, the device pairing logic 64 may utilize a device pairing history 69 in identify a peripheral device that has typically been paired with the computing device 10 in its present context.

Figure 3:
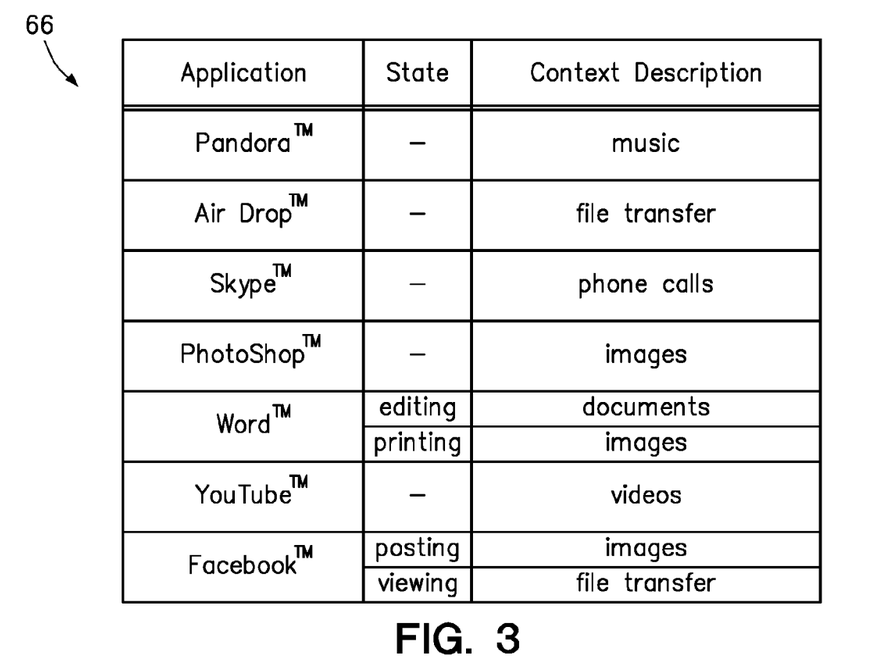
FIG. 3 is a list of applications, where each application is associated with one or more device context description.

FIG. 3 is a list of applications 66, where each application is associated with one or more context description. In this example, the Pandora™ application has been associated (i.e., placed in a common record) with a context description of "music", and the AirDrop™ application has been associated with a context description of "file transfer." Other applications are similarly identified in a record with an associated context. Notice that the Word™ application has been identified as having two states, with each state having its own context description. In an "editing" state the context description is "documents" and in a "printing" state the context description is "images".

Figure 4:
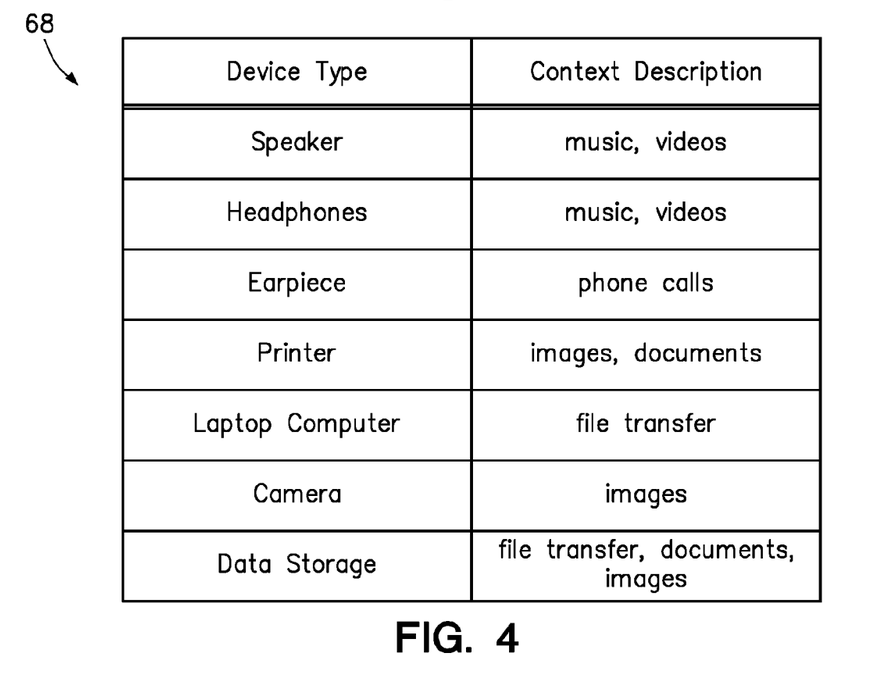
FIG. 4 is a list of peripheral device types, wherein each peripheral device type is associated with one or more device context description.

FIG. 4 is a list of peripheral device types 68, wherein each peripheral device type (first column) is associated (i.e., placed in a common record) with one or more context description (second column). In this example, a speaker is associated with a context description of "music" and "videos", a printer is associated with a context description of "images" and "documents". Other device types are associated with other context descriptions. In reference also to FIG. 3, when the Word™ application is in the "editing" state, the context description of "documents", as found in the list of applications 66, is also found in the list of peripheral device types 68 associated with a printer and data storage. When the Word™ application is in the "printing" state, the context description of "images", as found in the list of applications 66, is also found in the list of peripheral device types 68 associated with a printer and camera.

Figure 5:
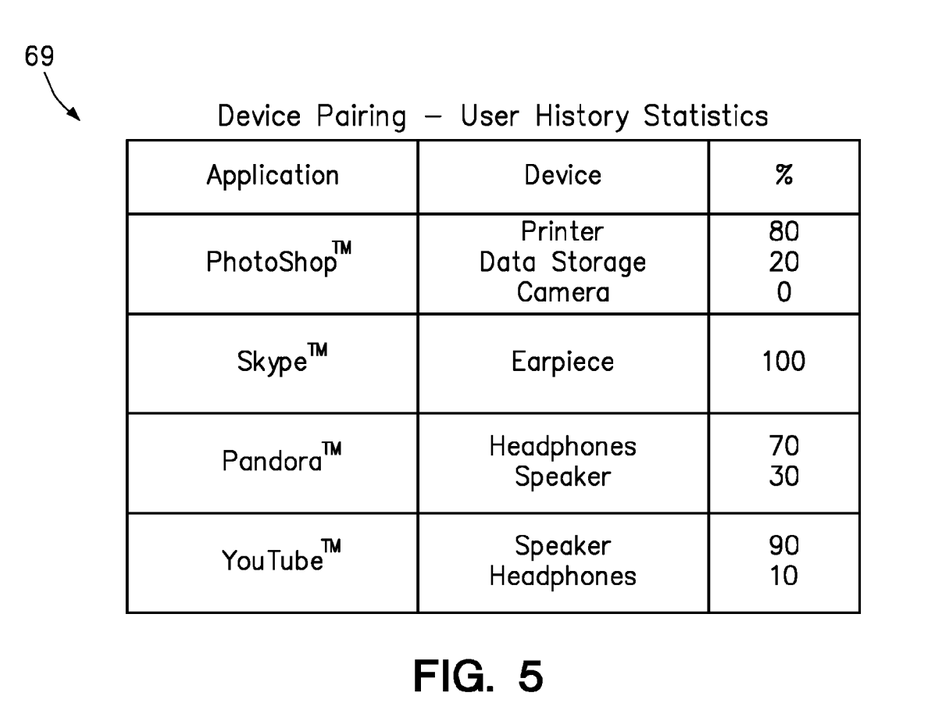
FIG. 5 is a table including user history statistics for device pairing on the computing device.

FIG. 5 is a table 69 including user history statistics for device pairing on the computing device. For example, when the computing device is running the PhotoShop™ application, the user has caused the computing device to pair with a printer 80% of the time and a data storage device 20% of the time, while never pairing with a camera. Accordingly, while the applications list 66 associates the PhotoShop™ application with the context description of "images", and the peripheral device types list 68 associates the context description of "images" with a printer, camera and data storage device, the user is most likely to want to pair with the printer. If automatic pairing is enabled, and the 80% pairing percentage exceeds a setpoint percentage for automatic pairing, then the PhotoShop™ application is automatically paired with the printer. If automatic pairing is disabled, then the device pairing logic may prompt the user to select from the printer, data storage device and camera.

Figure 6:
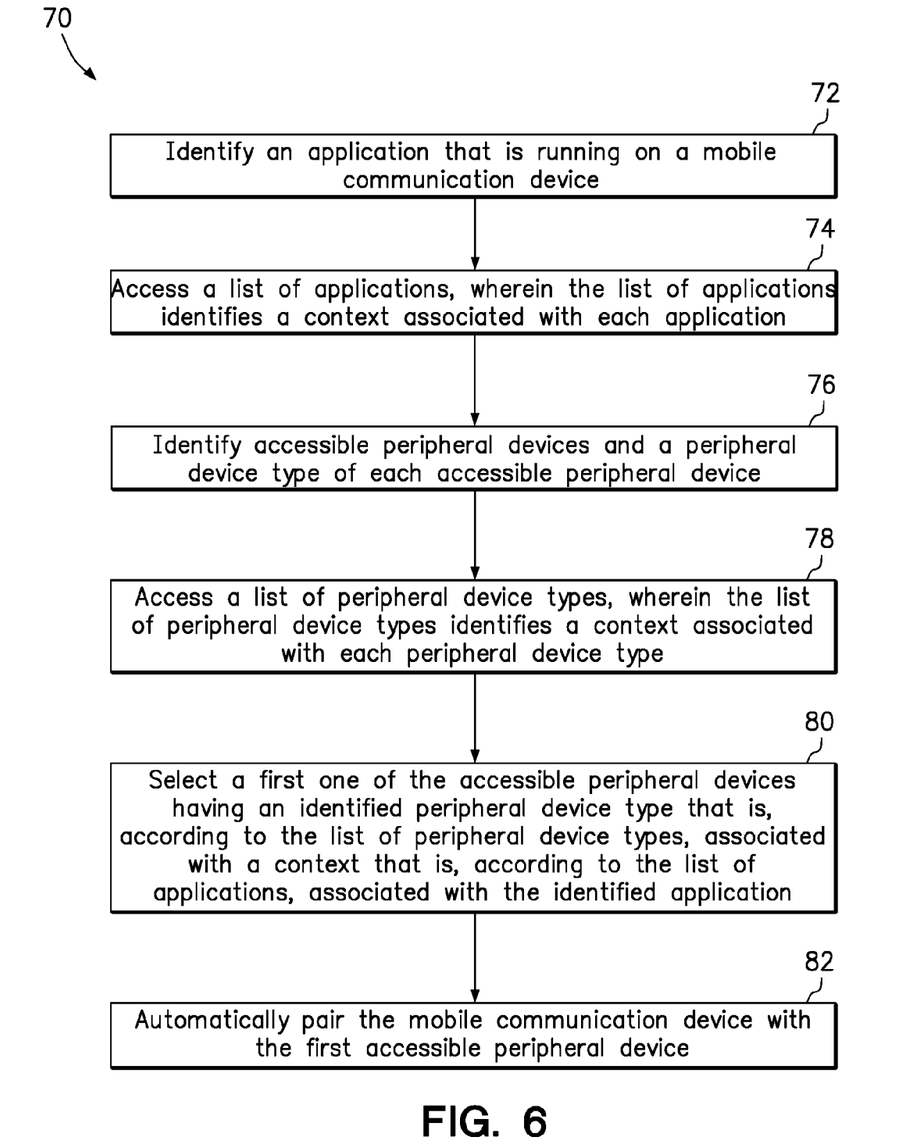
FIG. 6 is a flowchart of a method according to one embodiment of the present invention.

FIG. 6 is a flowchart of a method 70 according to one embodiment of the present invention, which may implement the device pairing logic 64 of FIG. 2. In step 72, the method identifies an application that is running on a computing device. In step 74, the method accesses a list of applications, wherein the list of applications identifies a context description associated with each application. The method identifies accessible peripheral devices and a peripheral device type of each accessible peripheral device in step 76, accesses a list of peripheral device types in step 78, wherein the list of peripheral device types identifies a context description associated with each peripheral device type. Then, in step 80, the method selects a first one of the accessible peripheral devices having an identified peripheral device type that is, according to the list of peripheral device types, associated with a context description that is, according to the list of applications, associated with the identified application. In step 82, the method automatically pairs the computing device with the first accessible peripheral device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context description of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context description clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    identifying an application that is running on a computing device;
    accessing a list of applications, wherein the list of applications identifies a context description associated with each application;
    identifying accessible peripheral devices and a peripheral device type of each accessible peripheral device;
    accessing a list of peripheral device types, wherein the list of peripheral device types identifies a context description associated with each peripheral device type;
    selecting a first one of the accessible peripheral devices having an identified peripheral device type that is, according to the list of peripheral device types, associated with a context description that is, according to the list of applications, associated with the identified application; and
    automatically pairing the computing device with the first accessible peripheral device.

2. The method of claim 1, wherein the computing device is selected from a smartphone, tablet computer, and laptop computer.

3. The method of claim 1, further comprising:
    detecting that the identified application has changed from a first state to a second state;
    selecting a second one of the accessible peripheral devices having an identified peripheral device type that is, according to the list of peripheral device types, associated with a context description that is, according to the list of applications, associated with the identified application in the second state; and
    automatically pairing the computing device with the second accessible peripheral device.

4. The method of claim 1, further comprising:
    detecting that the identified application has changed from a first state to a second state;
    identifying multiple accessible peripheral devices having an identified peripheral device type that is, according to the list of peripheral device types, associated with a context description that is, according to the list of applications, associated with the identified application in the second state;
    prompting a user for input selecting one of the identified multiple accessible peripheral devices; and
    pairing the computing device with the user-selected peripheral device.

5. The method of claim 1, further comprising:
    identifying a new application that is not on the list;
    using metadata of the new application to identify a context description of the new application; and
    adding the new application to the list of applications in association with the identified context description of the new application.

6. The method of claim 1, further comprising:
maintaining a history of pairings between the computing device and peripheral devices, wherein each record of the history identifies the peripheral device that was paired with the computing device and the application running on the computing device that interacted with the peripheral device; and
using the history of pairings to select between two or more peripheral devices having an identified peripheral device type that is, according to the list of peripheral device types, associated with a context description that is, according to the list of applications, associated with the identified application.

7. The method of claim 1, wherein identifying an application that is running on a computing device, includes identifying an application that is currently the active application on the computing device.

8. The method of claim 1, further comprising:
detecting that the currently active application has switched from a first application to a second application;
selecting a second one of the accessible peripheral devices having an identified peripheral device type that is, according to the list of peripheral device types, associated with a context description that is, according to the list of applications, associated with the second application; and
automatically pairing the computing device with the second accessible peripheral device.

9. The method of claim 1, further comprising:
detecting that the currently active application has switched from a first application to a second application;
identifying multiple accessible peripheral devices having an identified peripheral device type that is, according to the list of peripheral device types, associated with a context description that is, according to the list of applications, associated with the second application;
prompting a user for input selecting one of the identified multiple accessible peripheral devices; and
pairing the computing device with the user-selected peripheral device.

10. The method of claim 1, wherein identifying an application that is running on a computing device, includes identifying an application that has most recently been opened.

11. A computer program product comprising a non-transitory computer readable storage medium having program instructions embodied therewith, the program instructions executable by a processor to cause the processor to perform a method comprising:
identifying an application that is running on a computing device;
accessing a list of applications, wherein the list of applications identifies a context description associated with each application;
identifying accessible peripheral devices and a peripheral device type of each accessible peripheral device;
accessing a list of peripheral device types, wherein the list of peripheral device types identifies a context description associated with each peripheral device type;
selecting a first one of the accessible peripheral devices having an identified peripheral device type that is, according to the list of peripheral device types, associated with a context description that is, according to the list of applications, associated with the identified application; and
automatically pairing the computing device with the first accessible peripheral device.

12. The computer program product of claim 11, wherein the computing device is selected from a smartphone, tablet computer, and laptop computer.

13. The computer program product of claim 11, further comprising:
detecting that the identified application has changed from a first state to a second state;
selecting a second one of the accessible peripheral devices having an identified peripheral device type that is, according to the list of peripheral device types, associated with a context description that is, according to the list of applications, associated with the identified application in the second state; and
automatically pairing the computing device with the second accessible peripheral device.

14. The computer program product of claim 11, further comprising:
detecting that the identified application has changed from a first state to a second state;
identifying multiple accessible peripheral devices having an identified peripheral device type that is, according to the list of peripheral device types, associated with a context description that is, according to the list of applications, associated with the identified application in the second state;
prompting a user for input selecting one of the identified multiple accessible peripheral devices; and
pairing the computing device with the user-selected peripheral device.

15. The computer program product of claim 11, further comprising:
identifying a new application that is not on the list;
using metadata of the new application to identify a context description of the new application; and
adding the new application to the list of applications in association with the identified context description of the new application.

16. The computer program product of claim 11, further comprising:
maintaining a history of pairings between the computing device and peripheral devices, wherein each record of the history identifies the peripheral device that was paired with the computing device and the application running on the computing device that interacted with the peripheral device; and
using the history of pairings to select between two or more peripheral devices having an identified peripheral device type that is, according to the list of peripheral device types, associated with a context description that is, according to the list of applications, associated with the identified application.

17. The computer program product of claim 11, wherein identifying an application that is running on a computing device, includes identifying an application that is currently the active application on the computing device.

18. The computer program product of claim 11, further comprising:
detecting that the currently active application has switched from a first application to a second application;
selecting a second one of the accessible peripheral devices having an identified peripheral device type that is, according to the list of peripheral device types, associated with a context description that is, according to the list of applications, associated with the second application; and automatically pairing the computing device with the second accessible peripheral device.

19. The computer program product of claim 11, further comprising:

detecting that the currently active application has switched from a first application to a second application;

identifying multiple accessible peripheral devices having an identified peripheral device type that is, according to the list of peripheral device types, associated with a context description that is, according to the list of applications, associated with the second application;

prompting a user for input selecting one of the identified multiple accessible peripheral devices; and pairing the computing device with the user-selected peripheral device.

20. The computer program product of claim 11, wherein identifying an application that is running on a computing device, includes identifying an application that has most recently been opened.

* * * * *